United States Patent
Dudding et al.

(10) Patent No.: US 8,434,747 B2
(45) Date of Patent: May 7, 2013

(54) TRUCK SUSPENSIONS INCORPORATING ASYMMETRIC LEAF SPRINGS

(75) Inventors: Ashley T. Dudding, Plainfield, IL (US); Lawrence E Miller, Naperville, IL (US); William Wilson, Downers Grove, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 1007 days.

(21) Appl. No.: 11/464,390

(22) Filed: Aug. 14, 2006

(65) Prior Publication Data

US 2006/0290089 A1 Dec. 28, 2006

Related U.S. Application Data

(63) Continuation of application No. 09/572,736, filed on May 17, 2000, now abandoned.

(51) Int. Cl.
*F16F 1/18* (2006.01)
*B60G 11/00* (2006.01)

(52) U.S. Cl.
USPC ...... 267/36.1; 267/41; 267/283; 280/124.175

(58) Field of Classification Search .................. 267/36.1, 267/41, 47, 229, 259, 283; 280/124.163, 280/124.17, 124.175
See application file for complete search history.

(56) References Cited

U.S. PATENT DOCUMENTS

| | | | | |
|---|---|---|---|---|
| 3,674,249 A | * | 7/1972 | McGee | 267/52 |
| 4,033,608 A | * | 7/1977 | Sweet et al. | 280/5.515 |
| 5,470,096 A | * | 11/1995 | Baxter | 280/124.116 |

* cited by examiner

Primary Examiner — Melody Burch
(74) Attorney, Agent, or Firm — Cook Alex Ltd.

(57) ABSTRACT

A suspension system for supporting fore- and aft extending frame members of a vehicle chassis on a hollow axle, the system on one side of the vehicle being duplicated on the opposite side. Included in the suspension on each side are: (1) a frame bracket for pivotally supporting the fore or leading end of an asymmetric leaf spring; (2) a spring end support mounted on the frame side member for supporting the aft or trailing end of the leaf spring, and (3) a suitable assembly for attaching the leaf spring at a location intermediate its opposite ends to the axle so that the spring is divided into two cantilever limbs extending in opposite directions from the center line of the axle. The spring is formed so that one of the cantilever limbs has a stiffness substantially greater than the stiffness of the other limb. In all forms, at least one leaf of the asymmetric spring extends the full length of the spring. In one particular form the spring has a shorter leaf with an end portion extending over the axle with an air spring mounted either directly over the axle or on one side of the axle. Instead of having two leafs, the asymmetric spring may be formed as a tapered convolute single-leaf spring.

2 Claims, 3 Drawing Sheets

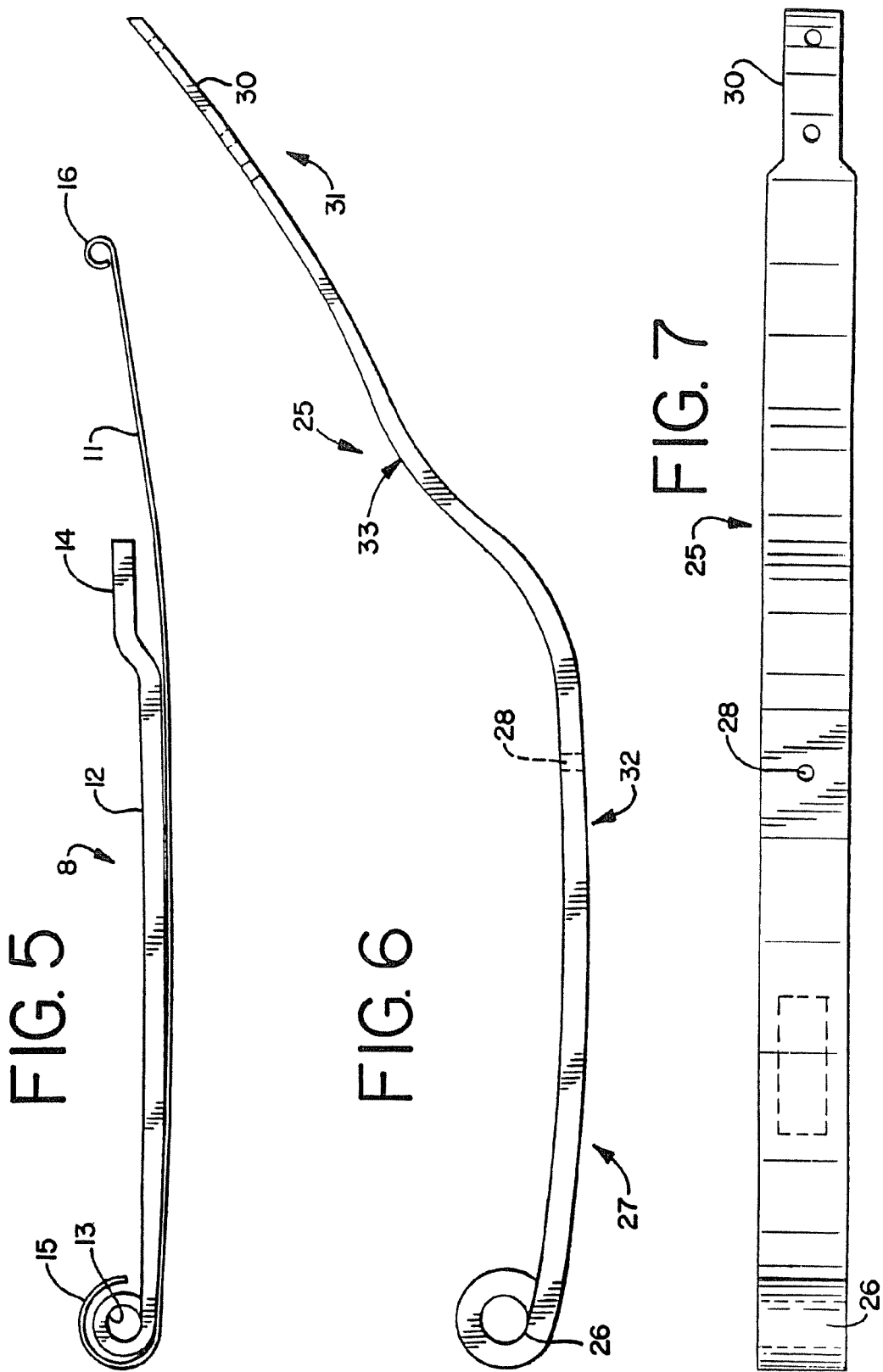

TRUCK SUSPENSIONS INCORPORATING ASYMMETRIC LEAF SPRINGS

CROSS-REFERENCE TO RELATED APPLICATION

This patent application is a continuation patent application of application Ser. No. 09/572,736, filed on May 17, 2000, now abandoned.

BACKGROUND OF THE INVENTION

This invention relates generally to innovations and improvements in axle suspensions for trucks and particularly to suspensions for the front steering axles of trucks wherein the axles are hollow and fabricated by welding. However, the invention also has application to rear axles and also to solid cast or forged solid axles. In all applications of the invention roll stability of the vehicles is materially enhanced.

The suspensions of the present invention incorporate asymmetric leaf springs extending in a fore-and-aft direction with one end pivotally attached to a mounting bracket on a generally fore-and-aft extending side frame member of a chassis with the opposite end suitably secured to the frame member. As used herein, the term "asymmetric" is not meant to denote different lengths of the cantilever limbs of the leaf spring, but rather their differing respective spring rates. At a location intermediate its opposite ends the leaf spring is suitably mounted on the adjacent end of an axle. If desired, the resilient support provided by the leaf spring may be augmented by the incorporation in the suspension of an air spring thereby providing the vehicle with "air ride" features.

The asymmetric leaf springs used in suspensions according to the invention are of two types. One type combines at least one leaf that extends the full length of the spring from end to end and at least one additional shorter leaf which extends from the end which is pivotally attached to a spring mounting bracket to the axle. Examples of such a leaf spring are disclosed in U.S. Ser. No. 09/522,585, filed Mar. 10, 2000, the disclosure of which is hereby incorporated herein by reference. The other type of spring incorporates a tapered convoluted single-leaf leaf spring which extends for the full length of the spring and is formed with a relatively thick cantilever limb extending in one direction from the axle to the pivotally attached end and a second relatively thin cantilever limb extending in the opposite direction from the axle to its opposite end. The thicker cantilever limb has a relatively high spring rate and is substantially stiffer than the relatively thin cantilever limb which has a relatively low spring rate and is substantially less stiff. An example of such a leaf spring is disclosed in U.S. Pat. No. 5,938,221, Aug. 17, 1999, issued to Wilson, the disclosure of which is hereby incorporated herein by reference. Alternatively, features of both types could be used, as disclosed in the aforementioned U.S. Ser. No. 09/522,585.

It will be understood that the construction of the suspension on one side of the vehicle supporting one side frame member on one end of an axle is duplicated on the opposite side of the vehicle.

In its preferred embodiments the axle suspensions of the present invention are characterized by being relatively light weight, low cost with high roll stability. Accordingly, the object of the invention, generally stated, is to provide axle suspensions which exhibit high roll stability and which are relatively light weight and commercially producible at relatively low cost from readily available components.

A more specific object of the invention is the provision of light weight, low cost axle suspensions by combining the high torsion stiffness of a hollow axle body with the torsion action provided by a leaf spring mounted on the axle with one cantilever limb having a stiffness substantially greater than the stiffness of the other cantilever limb, preferably in a ratio of at least 4 to 1.

Certain other objects of the invention will be apparent to those skilled in the art in view of the following detailed description taken in connection with the accompanying drawings wherein:

BRIEF DESCRIPTION OF THE DRAWINGS

FIG. 5 is a side elevational view of the fore-and-aft leaf spring incorporated in the suspensions shown in FIGS. 1-3;

FIG. 6 is a side elevational view of a tapered convolute single-leaf leaf spring that may be used in the suspensions of FIGS. 1-3 in place of the composite fore-and-aft leaf spring of FIGS. 1-5; and FIG. 7 is a top plan view of the spring shown in FIG. 6.

Referring to FIGS. 1 and 2 a suspension is indicated generally at 5 therein comprising a pair of fore-and-aft extending chassis side frame members indicated generally at 6-6 mounted on opposite ends of an axle indicated generally at 7. The axle 7 may for example, be a hollow fabricated front steering axle of a truck. The chassis is supported on the axle 7 in part by composite fore-and-aft extending leaf springs indicated generally at 8-8 and a pair of air springs indicated generally at 10-10. The fabricated axle 7 is hollow in cross section and of known type being fabricated by welding instead of being cast or forged with a solid cross section. Being hollow the fabricated axle 7 is characterized by having high torsional resistance considering its relatively low weight. It will be understood that other forms of axles may be used such as the hollow axle housings used in connection with rear drive axles.

Figure 1:
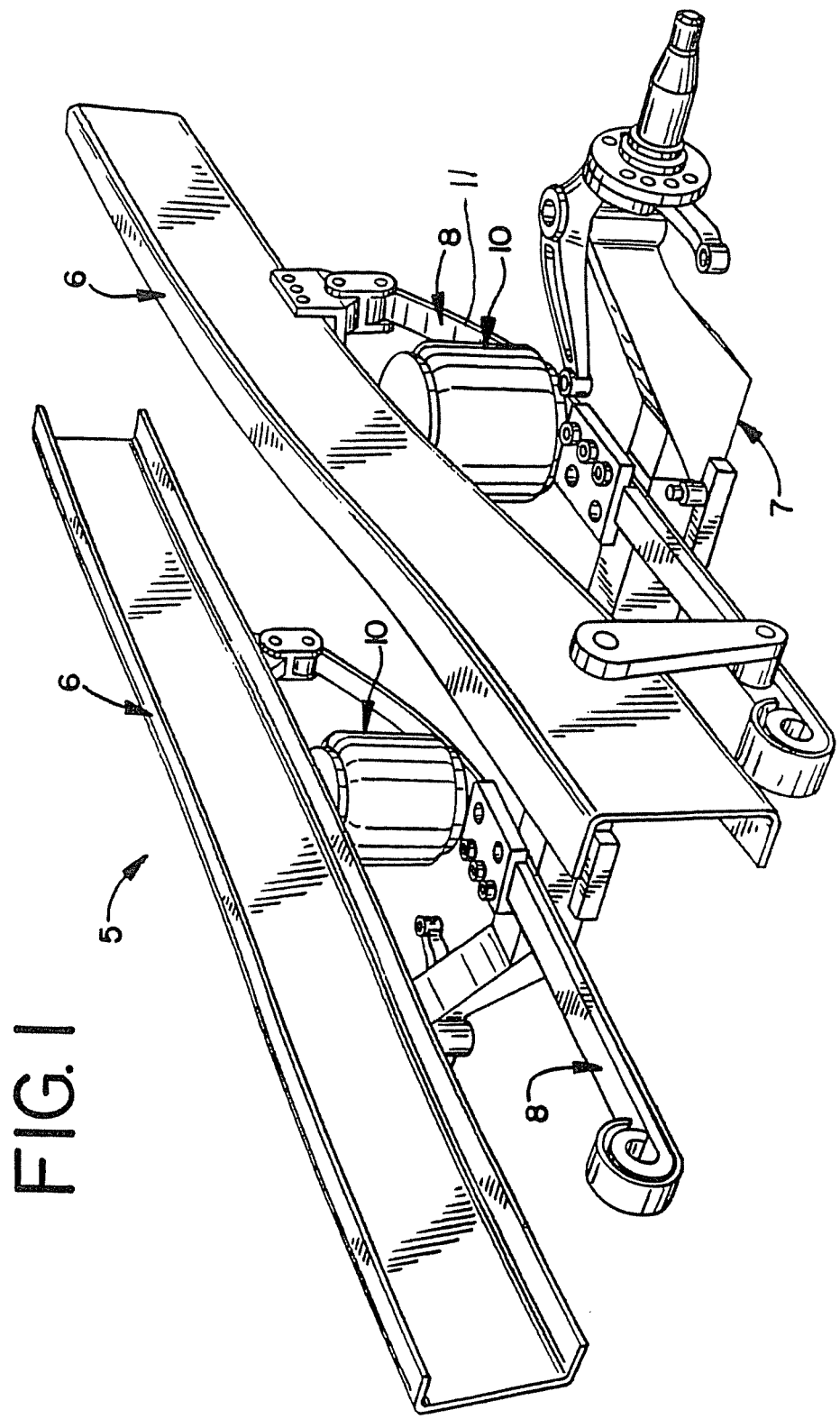
FIG. 1 is an isometric view of a preferred embodiment of the invention wherein a pair of chassis side frame members are shown supported on an axle by fore-and-aft extending leaf springs in combination with air springs.

Each fore-and-aft extending spring 8 is formed by a relatively thin full length single-leaf leaf spring 11 which may have a stiffness of about zero to four hundred pounds per inch combined with a relatively thick shorter leaf spring 12 which may have a stiffness of about one thousand or more pounds per inch, but always maintaining at least a four-to-one stiffness ratio between the front cantilever limb and rear cantilever limb. The leaf 12 is formed with an eye 13 at one end and an offset raised platform 14 at the opposite end on which one of the air springs 10 is mounted. If desired, the platform 14 may be formed as part of the top pad of 19 the axle clamping structure. The full length leaf spring 11 is formed with an eye 15 on one end which wraps around the eye 13 on the shorter leaf 12. At its opposite end the full length spring 11 is formed with an eye 16 which is pivotally connected to one end of a shackle 17 in known conventional manner. The interfitting eyes 13 and 15 constitute a so-called "military wrap" which is pivotally connected to the lower end of a bracket indicated generally at 18 the upper end of which is mounted on the side of a frame member 6. As is well known in the art, a military wrap connection provides redundancy in the event that one of the interfitting spring eyes breaks or fails for some reason.

Figure 2:
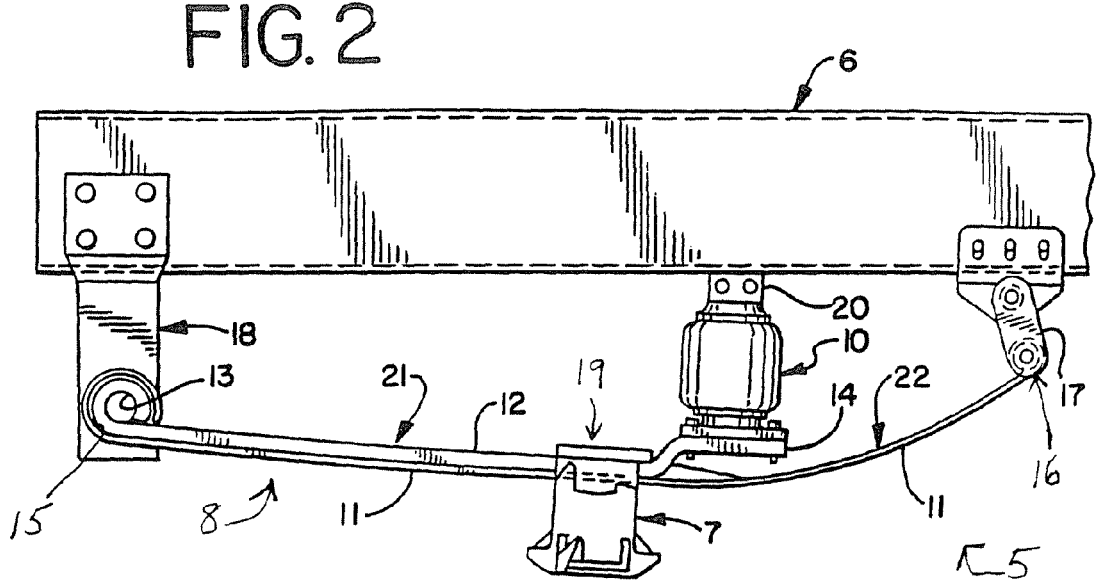
FIG. 2 is a side elevational view of the suspension shown in FIG. 1.
Figure 3:
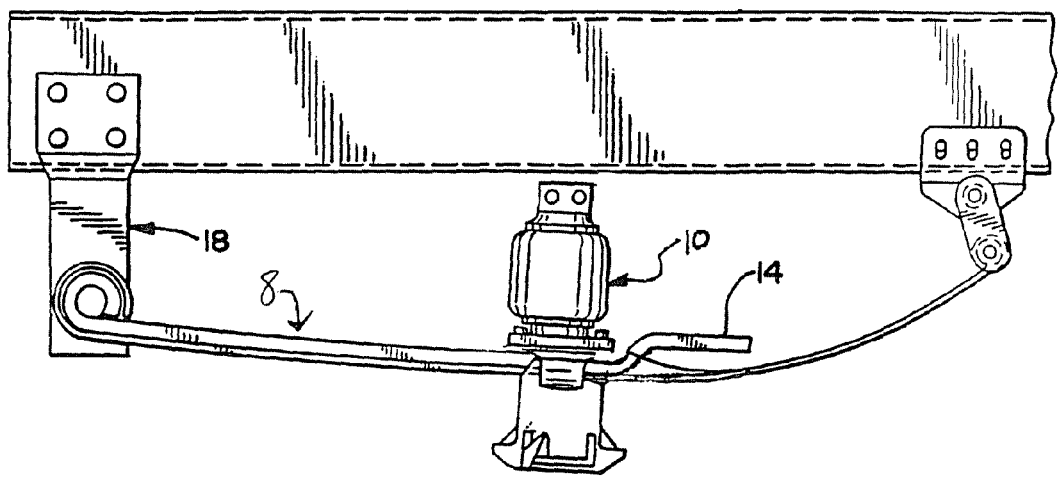
FIG. 3 is a side elevational view of the suspension system shown in FIG. 1 wherein the air spring is mounted directly over the axle.

Adjacent its distal end on which the platform 14 is formed the relatively thick leaf 12 and the full length leaf 11 are mounted on the axle 7 by known axle clamping structure as shown in FIGS. 1-3. Preferably each air spring 10 is mounted in known manner on a platform 14 with the upper end being attached to a bracket 20 mounted on a side frame member 6. Alternatively, the air spring 10 can be mounted directly over the axle 7 in the manner shown in FIG. 3. However, mounting the air spring 10 on the platform 14 to the side of the axle 7 opposite the bracket 18 is preferred since it provides an increased mechanical advantage for the air spring to support the vertical load.

In the arrangement shown in FIGS. 1 and 2 the air spring 10 and the cantilever limb indicated generally at 21 in FIG. 2 will together provide most of the vertical load support for the chassis while the cantilever limb indicated generally at 22 in FIG. 2 and formed in the full length leaf 11 may provide less than 10% of the support for the vertical load. The main function of the relatively thin full length leaf 11 is to react to side loads on the suspension and provide redundancy. This two-piece composite spring has the same high rate differentiation as stated in Wilson U.S. Pat. No. 5,938,221 dated Aug. 17, 1999 the disclosure of which is incorporated by reference herein.

The suspension arrangement shown in FIGS. 1 and 2 with the air spring 10 mounted on the platform 14 and offset from the center line of the front steering axle 7 provide beneficial results in the steering kinematics when axle 7 is a front steering axle. Thus, it is generally known in the art that springs arc about an imaginary point in space which is called the "Ross" point which in turn determines the sq-called "Ross Line". The Ross point is indicated at R in FIG. 4 and the Ross Line is indicated at RL. It is known that the Ross Line should be as flat and long as possible and the Ross Line geometry should match the drag link geometry of the vehicle.

Figure 4:
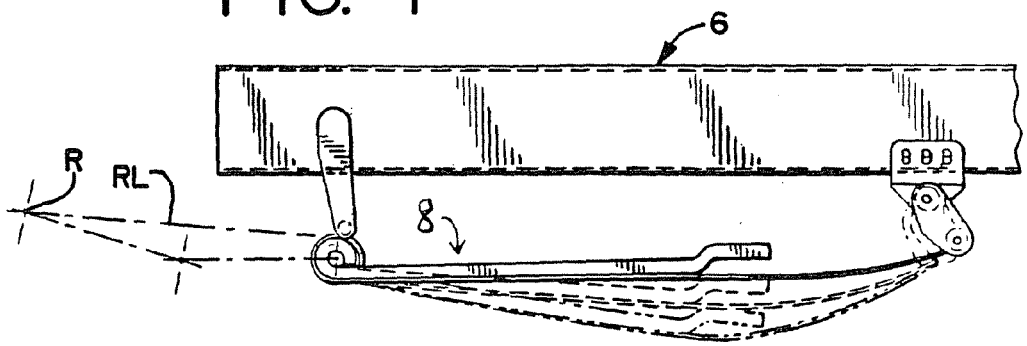
FIG. 4 is a diagrammatic view illustrating the steering kinematics of the fore-and-aft leaf spring incorporated in the suspensions of FIGS. 1-3.

As shown in FIG. 4, as the composite spring 8 is loaded the fact that the air spring 10 is cantilevered behind the axle center causes the limb 11 to rotate towards more caster. This produces a long and flat Ross Line (RL). When the air spring 10 is mounted over the axle 7 as shown in FIG. 3 the Ross Line is relatively short and steep and the Ross Point is located inwardly (i.e. to the right) of the eye of the spring 8.

The suspension configuration shown in FIGS. 1 and 2 with the air springs 10 mounted on the platforms 14 in cantilever behind the center line of the axle 7 allows the fore-and-aft extending spring 8 to be designed to fit existing vehicle packages. Thus, the front eyes 13, 15 of the springs may be fitted to an existing hanger. The front cantilever limb 22, the rear cantilever limb 21 and the load on the air spring 10 may be optimized to the point where the Ross Line characteristics may be tuned to match the existing steering linkage installation of the vehicle.

While the composite springs 8 offer the several advantages referred to above they may be replaced by tapered convolute single-leaf leaf springs indicated generally at 25 in FIGS. 6 and 7. The construction and functioning of the spring 25 are shown and described in detail in U.S. Pat. No. 5,938,221 dated Aug. 17, 1999 the disclosure of which is incorporated by reference herein. The spring 25 is formed with an eye 26 at one end which may be attached to the mounting bracket 18 (FIGS. 2-3). The front cantilever limb of the spring 25 is indicated generally at 27 and extends from the eye 26 to an aperture 28 located within the mid portion of the spring. As shown, the cantilever limb 27 extends in a generally continuous direction from the eye 26 to the point 28 so that no corrugations are formed within the limb. The cantilever limb which extends from the point 28 to the end of the spring indicated at 30 is indicated at 31. The cantilever limb 31 extends in a generally continuous direction from the point 28 to its end 30 with no corrugations formed therein.

The cantilever limb 27 includes an axle area indicated generally at 32. This seat area includes the bottom most point 28 of the tapered convolute leaf spring 25 when the leaf spring is connected to a vehicle chassis frame.

A reverse arch portion in the cantilever limb 31 is indicated generally at 33. It will be noted that the thickness of the spring 25 is greatest in the cantilever limb 27 and tapers to a thinner thickness in the cantilever limb 31. Except for the end 30 the spring 25 has a uniform width as shown in FIG. 7.

What is claimed is:

1. A suspension system for supporting a fore-and-aft extending frame member on one side of a vehicle chassis on an adjacent end of an axle of a vehicle, comprising:
   (a) a frame bracket mounted on said frame member;
   (b) a spring end support mounted on said frame member in spaced relationship from said frame bracket;
   (c) a composite leaf spring connected to said frame bracket by way of a first composite leaf spring eye at a first end of the composite leaf spring and connected to said spring end support by way of a second composite leaf spring eye at a second end of the composite leaf spring, said composite leaf spring being clamped to said axle by axle clamping structure, said composite leaf spring including
      (i) a full length first leaf; and
      (ii) a shorter, thicker second leaf;
   (d) said first leaf having
      (i) a military wrap eye positioned at said first end of the composite leaf spring; and
      (ii) a spring end support connection eye forming the second composite leaf spring eye and positioned at said second end of the composite leaf spring and connected to said spring end support;
   (e) said shorter, thicker second leaf having a frame bracket connection eye forming the first composite leaf spring eye, said frame bracket connection eye of said second leaf having an outer diameter and positioned at said first end of the composite leaf spring and connected to said frame bracket, said military wrap eye of said full length first leaf being sufficiently large enough to receive said outer diameter of said first composite leaf spring eye formed by said frame bracket connection eye of the shorter, thicker second leaf, said first composite leaf spring eye being in interfitting relationship with said military wrap eye of the first leaf such that said military wrap eye of the full length first leaf wraps around the outside of at least part of said first composite leaf spring eye;
   (f) said composite leaf spring being divided into a first cantilever limb extending from a center line of said vehicle axle to said first end of the composite leaf spring and a second cantilever limb extending from said center line of the vehicle axle to said second end of the composite leaf spring;
   (g) said full length first leaf providing redundancy for said composite leaf spring;
   (h) said second leaf being clamped to said axle by said axle clamping structure and extending at least to said center line of the vehicle axle but terminating short of said second end of the composite leaf spring;

(i) said second leaf being substantially shorter and substantially thicker than said first leaf;

(j) said first cantilever limb having a stiffness substantially greater than a stiffness of said second cantilever limb such that said composite leaf spring is asymmetric;

(k) said first cantilever limb providing significant vertical load support for said vehicle chassis (l) said second leaf having an end portion extending over and spaced apart from said first leaf, said end portion being adjacent to said axle and on the side thereof opposite said frame bracket, and an air spring connected to said end portion extending in chassis supporting relationship between said end portion and said frame member.

2. The suspension system defined by claim 1 wherein said axle has a torsionally stiff hollow axle body exhibiting high torsional stiffness.

* * * * *